(12) United States Patent
Malphettes

(10) Patent No.: US 9,994,277 B2
(45) Date of Patent: Jun. 12, 2018

(54) THREE-WHEELED TILTING VEHICLE

(71) Applicant: Bruno Malphettes, Le Vesinet (FR)

(72) Inventor: Bruno Malphettes, Le Vesinet (FR)

( * ) Notice: Subject to any disclaimer, the term of this patent is extended or adjusted under 35 U.S.C. 154(b) by 0 days. days.

(21) Appl. No.: 14/914,059

(22) PCT Filed: Sep. 2, 2014

(86) PCT No.: PCT/FR2014/052165
§ 371 (c)(1),
(2) Date: Apr. 26, 2016

(87) PCT Pub. No.: WO2015/028767
PCT Pub. Date: Mar. 5, 2015

(65) Prior Publication Data
US 2016/0251051 A1    Sep. 1, 2016

(30) Foreign Application Priority Data

Sep. 2, 2013    (FR) ...................................... 13 58375

(51) Int. Cl.
| | |
|---|---|
| *B62K 5/10* | (2013.01) |
| *B60G 3/20* | (2006.01) |
| *B62K 5/027* | (2013.01) |
| *B62K 5/05* | (2013.01) |
| *B62K 5/08* | (2006.01) |
| *B62K 5/02* | (2013.01) |
| *B62K 5/00* | (2013.01) |

(52) U.S. Cl.
CPC .................. *B62K 5/10* (2013.01); *B60G 3/20* (2013.01); *B62K 5/02* (2013.01); *B62K 5/027* (2013.01); *B62K 5/05* (2013.01); *B62K 5/08* (2013.01); *B60G 2200/144* (2013.01); *B60G 2204/46* (2013.01); *B60G 2300/122* (2013.01); *B60G 2300/45* (2013.01); *B62K 2005/001* (2013.01)

(58) Field of Classification Search
CPC . B62K 5/10; B62K 5/02; B62K 5/027; B62K 5/08; B62K 5/05; B62K 2005/001; B60G 3/20; B60G 2200/144; B60G 2300/45; B60G 2300/122; B60G 2204/46
See application file for complete search history.

(56) References Cited

U.S. PATENT DOCUMENTS 2,819,093 A * 1/1958 Geiser .................... B60G 21/00
                                                      180/215
4,632,413 A * 12/1986 Fujita ....................... B60G 3/01
                                                      280/124.103
(Continued)

FOREIGN PATENT DOCUMENTS

| EP | 0251906 A1 | 1/1988 |
|---|---|---|
| JP | S61229608 A | 10/1986 |

(Continued)

*Primary Examiner* — Paul N Dickson
*Assistant Examiner* — Timothy Wilhelm
(74) *Attorney, Agent, or Firm* — Bachman & LaPointe, P.C.

(57) ABSTRACT

An inclinable vehicle having a tilting front wheel set, comprising a double deformable parallelogram connecting the two front wheels to the chassis, and two dampers associated with suspension springs, each connecting one of the suspension arms, to a common connection plate, characterized in that said connection plate is guided by an arch secured to the chassis.

16 Claims, 9 Drawing Sheets

(56) References Cited

U.S. PATENT DOCUMENTS

| | | | | |
|---|---|---|---|---|
| 4,647,053 A * | 3/1987 | Kanno | | B62D 37/00 |
| | | | | 280/6.154 |
| 5,765,846 A * | 6/1998 | Braun | | B60G 21/026 |
| | | | | 280/124.103 |
| 7,530,419 B2 | 5/2009 | Brudeli | | |
| 7,607,695 B2 * | 10/2009 | Moulene | | B60G 21/007 |
| | | | | 280/5.507 |
| 7,648,148 B1 | 1/2010 | Mercier | | |
| 7,665,742 B2 * | 2/2010 | Haerr | | B60G 21/007 |
| | | | | 280/124.157 |
| 8,141,890 B2 * | 3/2012 | Hughes | | B60G 21/007 |
| | | | | 180/210 |
| 8,419,027 B2 | 4/2013 | Ting et al. | | |
| 8,596,660 B2 * | 12/2013 | Hsu | | B62K 5/025 |
| | | | | 180/210 |
| 8,641,064 B2 * | 2/2014 | Krajekian | | B62K 5/027 |
| | | | | 180/210 |
| 8,762,003 B2 * | 6/2014 | Mercier | | B60G 17/0157 |
| | | | | 180/210 |
| 9,061,732 B1 * | 6/2015 | Vezina | | B62M 27/02 |
| 2005/0206101 A1 | 9/2005 | Bouton | | |
| 2008/0012262 A1 * | 1/2008 | Carabelli | | B60G 7/006 |
| | | | | 280/124.106 |
| 2008/0197597 A1 | 8/2008 | Moulene et al. | | |
| 2011/0215544 A1 | 9/2011 | Rhodig | | |
| 2016/0144680 A1 * | 5/2016 | Simon | | B60G 3/20 |
| | | | | 280/124.103 |

FOREIGN PATENT DOCUMENTS

| | | |
|---|---|---|
| WO | 03057549 A1 | 7/2003 |
| WO | 2005002957 A1 | 1/2005 |
| WO | 2005051689 A1 | 6/2005 |
| WO | 2007127783 A1 | 11/2007 |
| WO | 2011005945 A1 | 1/2011 |

* cited by examiner

THREE-WHEELED TILTING VEHICLE

BACKGROUND

The present invention relates to field of inclinable three-wheeled vehicles, such as scooters, having two front steered wheels parallel to each other and inclinable with respect to the ground, with the chassis.

These vehicles combine the easy handling of a scooter with the safety afforded by better adhesion to the ground and the stability resulting from a means that does not exist on a two-wheeler.

Numerous solutions with motorised machines with two twin front wheels are known in the prior art.

By way of example, the international application WO03057549 describes a set of orientable wheels with induced inclination, which has a pair of parallel wheel hub carriers, placed on each side of an inclinable chassis edge. A system of articulated triangular bars and a transmission connect the wheel hub carriers to the chassis edge, so that the wheels incline while remaining parallel to the chassis on bends in unison with the chassis edge. A steering mechanism couples the wheel hub carriers to the chassis edge, so that an inclination induced on the chassis edge directs the wheel hub carriers at a steering angle that depends on the angle of the inclination induced.

European patent application EP0251906 describes a stabilising device for an inclinable vehicle formed by a deformable primary part connected to the ground, in which a carrier element turns about an element when the vehicle tilts, and a carried element connected to a secondary part movable with respect to the primary part is raised during this inclination by virtue of a rotation multiplying system acting on a carrier arm, so that the centre of gravity G of the whole of the vehicle is itself raised during such an inclination movement, which ensures stability of the vehicle.

The international application WO2011005945 describes another example of an inclinable vehicle comprising a chassis that pivots with respect to a chassis element pivoting about a pivot axis. A torque exerted on a steering assembly in a first direction causes the chassis to pivot with respect to the chassis element pivoting in an opposite second direction at least when the speed of the vehicle is greater than a first threshold speed in order to steer the vehicle in the second direction. An actuator urges the chassis in the direction of a vertical position when the chassis is in an inclined position and a speed of the vehicle is below a second threshold value. The invention also concerns a method according to which a torque is exerted on the chassis in the direction opposite to the steering torque when the speed is above the first threshold speed. The torque exerted by the actuator is opposite to the angle of inclination when the speed of movement is below the second threshold speed.

The international application WO2007127783 describes a vehicle that comprises vehicle bodywork and a vehicle support assembly. The bodywork of the vehicle has a longitudinal axis and is configured so as to carry a rider on it. The support assembly comprises first and second inclinable wheels each disposed at a different lateral location with respect to the longitudinal axis, an inclination mechanism associating the bodywork of the vehicle while supporting it from inclinable wheels in order to enable the bodywork of the vehicle to incline in a first inclination range with respect to the surface on which the inclinable wheels are disposed and an inclination limiter associated functionally with the inclination mechanism in order to limit the inclination of the bodywork of the vehicle to a value below the first inclination range, a limiter that can be deactivated in order to allow an inclination throughout the first inclination range.

The international application WO2005051689 relates to a vehicle chassis with a tilting system, which comprises a differential gearing driving opposed half-shafts. Each half-shaft is connected to a respective wheel hub. Pivoting connection links are provided between the chassis and the hubs; and a control arm, provided between the chassis and the axle head, limits the movement thereof. This device constitutes a novel vehicle design with a tilting system provided with a shaft transmission and a low centre of gravity.

The international application WO2005002957 relates to a three-wheeled vehicle, which comprises a chassis with an engine, driving gears and at least one driven wheel at the rear, and two front wheels used partly to steer the vehicle. This vehicle may also be steered so that the chassis with the engine, the driving gears and the driven rear wheel can be inclined to the side in order to turn like a motorcycle. This invention relates in particular to a vehicle design that contributes to the moving of the centre of gravity, when such a vehicle is inclined to the side, so that it is in particular easier to straighten it up. This invention also makes it possible to modify and determine the driving characteristics of the vehicle by varying various design parameters, while remaining within the field covered by the present invention. This invention also relates to a special design for mounting footrests on which the rider of the vehicle can place his feet while driving the vehicle. This special design actively contributes to modifying the geometry between footrests and the vehicle chassis when the vehicle is used and in particular when it is inclined to the side in order to turn.

The American U.S. Pat. No. 7,530,419 describes another example of a three-wheeled vehicle, consisting of a chassis with an engine, driving gears and at least one driven wheel at the rear, and two front wheels used partly to steer the vehicle. This vehicle may also be steered so that the chassis with the engine, the driving gears and the driven rear wheel can be inclined to the side in order to turn like a motorcycle. This invention relates in particular to a vehicle design that contributes to the moving of the centre of gravity, when such a vehicle is inclined to the side, so that it is in particular easier to straighten it up. This invention also makes it possible to modify and determine the driving characteristics of the vehicle by varying various design parameters, while remaining within the field covered by the present invention.

The American patent application US20110215544 describes a variant of a three-wheeled vehicle, a left wheel having a first rotation shaft, the right wheel coupled mechanically to the base on the left-hand side of the longitudinal axis with a left-hand independent suspension mechanism that urges the left wheel against the road over a range of vertical movement of the left wheel, a first left-hand mechanism dimension varying in response to the vertical movement of the left wheel. The right wheel having a second rotation axis, the right wheel coupled mechanically to the base on the right of the longitudinal axis with a right independent suspension mechanism that urges the right wheel against the road over a range of vertical movement of the right wheel, a second dimension of the right-hand mechanism varying in response to the vertical movement of the right wheel.

The American U.S. Pat. No. 7,648,148 describes a vehicle comprising a chassis having a front part and a rear part. A pivoting chassis element is connected pivotally to the chassis about a roughly horizontal pivot axis. The chassis can pivot with respect to the frame element and can pivot between a vertical position and a plurality of sloping positions. The steering assembly is supported by the frame in order to steer the vehicle. An actuation device has a first part connected to the chassis and a second part connected to the pivoting element of the chassis. The actuator functions so as to selectively pivot the frame with respect to a reference angle about the pivot axis. The method comprises: determining a steering torque exerted on the steering assembly, determining a speed of movement of the vehicle, determining an angle of inclination of the mount with respect to the pivoting element of the chassis, and exerting a torque about the pivot axis in a first direction using the actuator in response to a steering torque exerted on the steering assembly in a second direction opposite to the first direction when the speed of movement is greater than a threshold speed, which causes the vehicle to turn in the first direction.

The American U.S. Pat. No. 8,419,027 describes another steering system for a vehicle comprising a frame having a steering tube, a control rod extending rotatably through the steering tube, an inclinable unit disposed on the steering tube, two suspension units connected to and disposed partially under the inclinable unit, and two front wheels connected respectively to the suspension units. The inclinable unit comprises two lateral tubes flanking the steering tube. The suspension units extend respectively in the two lateral tubes.

The solutions of the prior art have a first drawback relating to the control of the inclination at rest. In this case, no centrifugal force compensates for the transverse component, and the weight of the machine has a tendency to amplify the inclination as soon as it commences to lean.

When the machine is heavy, controlling it at rest or during manoeuvres at very low speed may prove to be a problem, in particular for a novice who is not very muscular. The weight of some machines exceeds 200 kg, and it then becomes very difficult to prevent the machine from tilting and falling when the inclination inadvertently exceeds a significant angle. Lifting the machine again is then sometimes quite simply impossible for a person without help.

A second drawback concerns the weight of the mechanisms used for articulating the front wheels. This weight constitutes an unsprung weight detrimental to the dynamic qualities and comfort of the machine.

These weights may also be detrimental to the performance (consumption, acceleration, maximum speed) of a machine when the engine is of low capacity, for example 50 $cm^2$.

SUMMARY

The present invention aims to remedy these drawbacks by proposing a system for articulating the twin wheels of a tilting machine that is simple and reliable, offering a solution for tilting of the suspensions, allowing working thereof always in an optimum operating geometry. This solution also produces a return torque opposing the amplification of the angle in the event of inopportune tilting when stopped or at low speed.

To this end, the invention relates, in accordance with its most general acceptance, an inclinable vehicle having a tilting front wheel set, comprising a double parallelogram connecting the two front wheels to the chassis, and two dampers associated with suspension springs each connecting one of the branches to a common connection plate, characterised in that said connection plate is able to move and is guided by an arch secured to the chassis.

"Connection plate" will mean, within the meaning of the present patent, the movable part moving on the path imposed by the arch secured to the chassis, and on which the top ends of the two dampers are articulated. The movement of the plate with respect to the arch is imposed by the respective forces exerted by the two dampers and depend on the inclination of the vehicle with respect to the vertical longitudinal plane of the chassis.

"Arch" will mean a fixed part, secured to the chassis, providing the constrained guidance of the connection plate. This "arch" may be a rail, a plurality of rails, a profiled section, or any other configuration making it possible to provide guidance of the connection plate on a predefined path. This arch is symmetrical with respect to the vertical longitudinal plane of the vehicle chassis and has, on either side of this plane, two curved branches.

The movement of the connection plate/of the carriage describes a path not constrained by a circle with a radius greater than that of the arch, the resulting constraint in fact acting on the suspensions during "rocking".

According to a variant, said arch has a radius of curvature decreasing towards each of the ends.

According to another variant, said connection plate has a guide carriage complementary to a guide path provided on said arch. Advantageously, said arch has a radius of curvature decreasing towards each of the ends.

The movement of the connection plate/of the carriage describes a path not constrained by a circle with a radius greater that of the arch, the resulting constraint in fact acting on the suspensions during "rocking".

Advantageously, said guide carriage has two lateral rollers complementary to the guide path and two rollers disposed radially with respect to the arch.

According to a particular embodiment, the ends of said guide arch are connected to the chassis by connecting arms defining a window for the dampers to pass.

According to a particular variant, the vehicle comprises a means for locking the relative movement of said plate with respect to said arch.

Advantageously, said locking means comprises a moon-shaped notched jaw actuated by a cable.

According to another particular variant, the steering column has an angled form, with an end articulated with respect to the double parallelogram coaxial with the top end of the steering column.

According to a variant, the vehicle comprises a locking means actuated by a mechanical connection connected to a means of actuating a mechanical member controlled by the rider.

According to a variant, the vehicle comprises an additional means for retaining the inclination, comprising two carriages sliding on the top part of the arch, on either side not only of the vertical central axis that constitutes the edge of the chassis, but also of the movable carriage connected to the suspensions. These two carriages are connected together by one or more springs.

According to another variant, said connection plate has a guide carriage complementary to a guide path provided on said arch.

Advantageously, said guide carriage has four or more lateral rollers, with a smaller diameter, mounted on the same axis as the main rollers, complementary to two lower guide paths positioned opposite the top main guide path and two rollers disposed with respect to the arch.

According to a particular embodiment, the arch is maintained by a construction composed of two perpendicular plates pierced by the beam tubes that extend the chassis.

According to a particular variant, the vehicle comprises a means for locking the relative movement of said plate with respect to said arch, actuated by a mechanical connection controlled by the rider.

Advantageously, said locking means consist of one or more notched followers, actuated by a mechanism, biting into the part of the guide carriage also composed of one or more notched plates.

BRIEF DESCRIPTION OF THE DRAWINGS

The invention will be understood better from a reading of the following description, referring to the accompanying drawings illustrating a non-limitative example embodiment, where.

DETAILED DESCRIPTION

Figure 1:
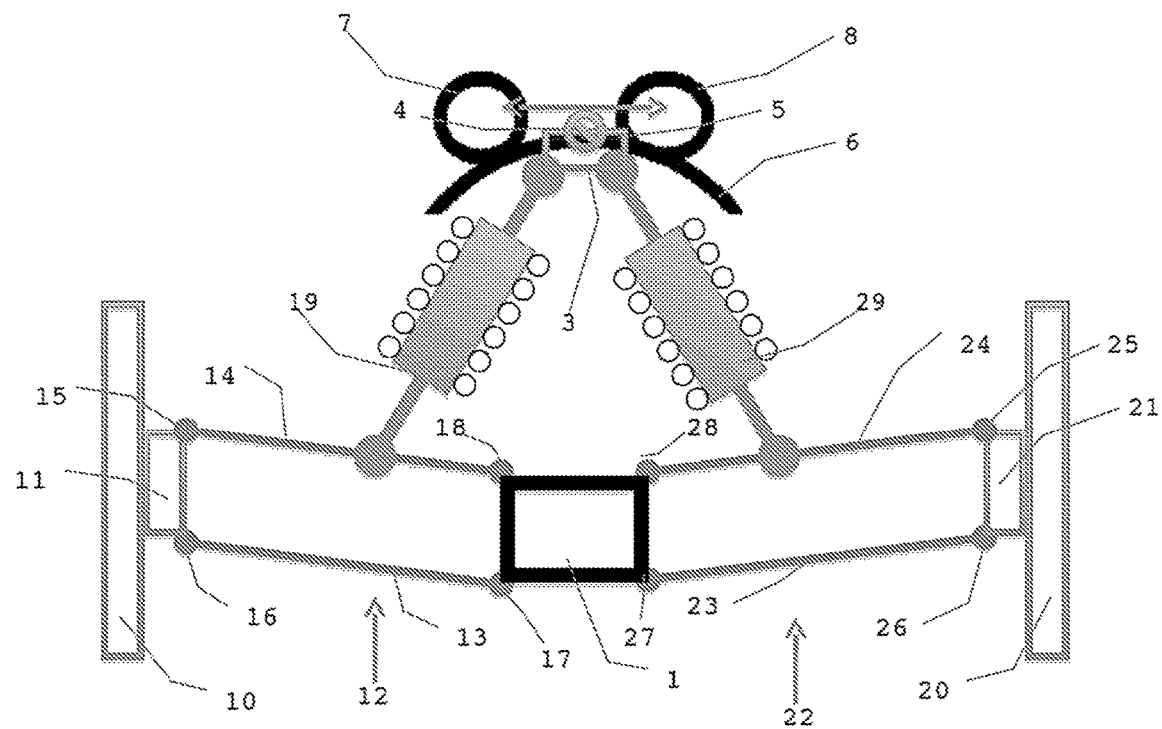
FIG. 1 depicts a schematic front view of the connection between the chassis and the wheels.

FIGS. 1 to 4 depict a schematic view of the system for articulating the tilting front wheels.

The chassis (1, 8) extends longitudinally with respect to the machine and supports the various components (engine, steering column (40), rider's seat, the support for the rear wheel, the floor, and one or more props). The two front wheels (10, 20) are steered and tilting. They are mounted in a known fashion on swivels (11, 21) connected to the chassis (1) by deformable parallelograms respectively (12, 22). These deformable parallelograms (12, 22) each have a bottom link (or suspension arm) (13, 23) and a top link (or suspension arm) (14, 24). These links (14, 24; 13, 23) are articulated respectively with respect to the swivel carriers (11, 21) and to the chassis (1) by journals (15, 16, 25, 26; 17, 18; 27, 28).

The front wheel set is suspended by two spring/damper suspensions (19, 29) each connected by a journal to the top suspension arm respectively (14, 24). The other end of the dampers (19, 29) is connected to a common plate (3) by articulations.

This plate is secured to (or forms a single piece with) a movable carriage (5), the movement of which is constrained by an arched rail (6) placed in the transverse plane, and symmetrical with respect to the sagittal plane, the intersection of the transverse plane and sagittal plane defining the inclination axis of the chassis with respect to the vertical.

This arched rail (6) is secured to the chassis, to which it is connected by a connection at the rail and by elements of the chassis (7, 8) connecting the arched rail (6) to the chassis (1).

The guidance of the movable carriage (5) with respect to the arched rail (6) is provided by rollers disposed under the rail (6). These rollers limit the degrees of freedom between the carriage (5) and the rail (6), so that the only possible movement is determined by the profile of the rail (5). This profile determines a curve symmetrical with respect to the sagittal plane.

When the decrease in the radius of curvature is great, the return torque increases. The variation in the radius of curvature may be continuous or variable in order to modulate the effect of the return between slight tilts, not requiring a high return torque, and pronounced tilts, where a higher return torque is sought.

A locking mechanism (4) is provided for locking the carriage (5) with respect to the rail (6), in a central position, in order to provide static stability, and prevents inopportune tilting when the machine is stopped, in particular when parking. This locking mechanism (4) may be controlled mechanically, electrically or hydraulically.

This locking mechanism (4) may also be actuated by a mechanical or electrical control, to enable the user to stabilise the machine when temporarily stopped, for example at a traffic light, or at low speed.

Figure 2:
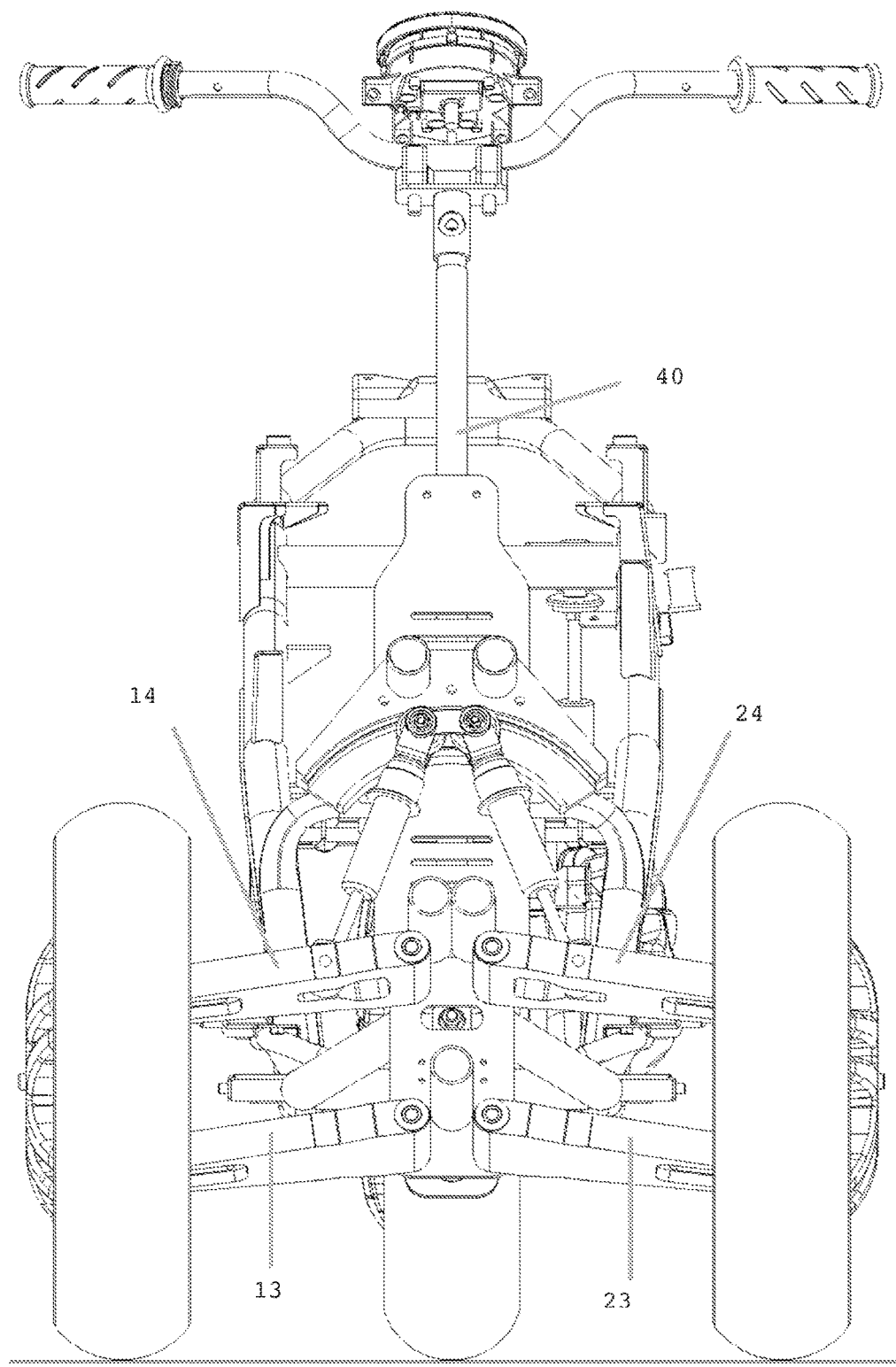
FIGS. 2 and 3 depict front views of the scooter, respectively in the upright position and in the inclined position.
Figure 3:
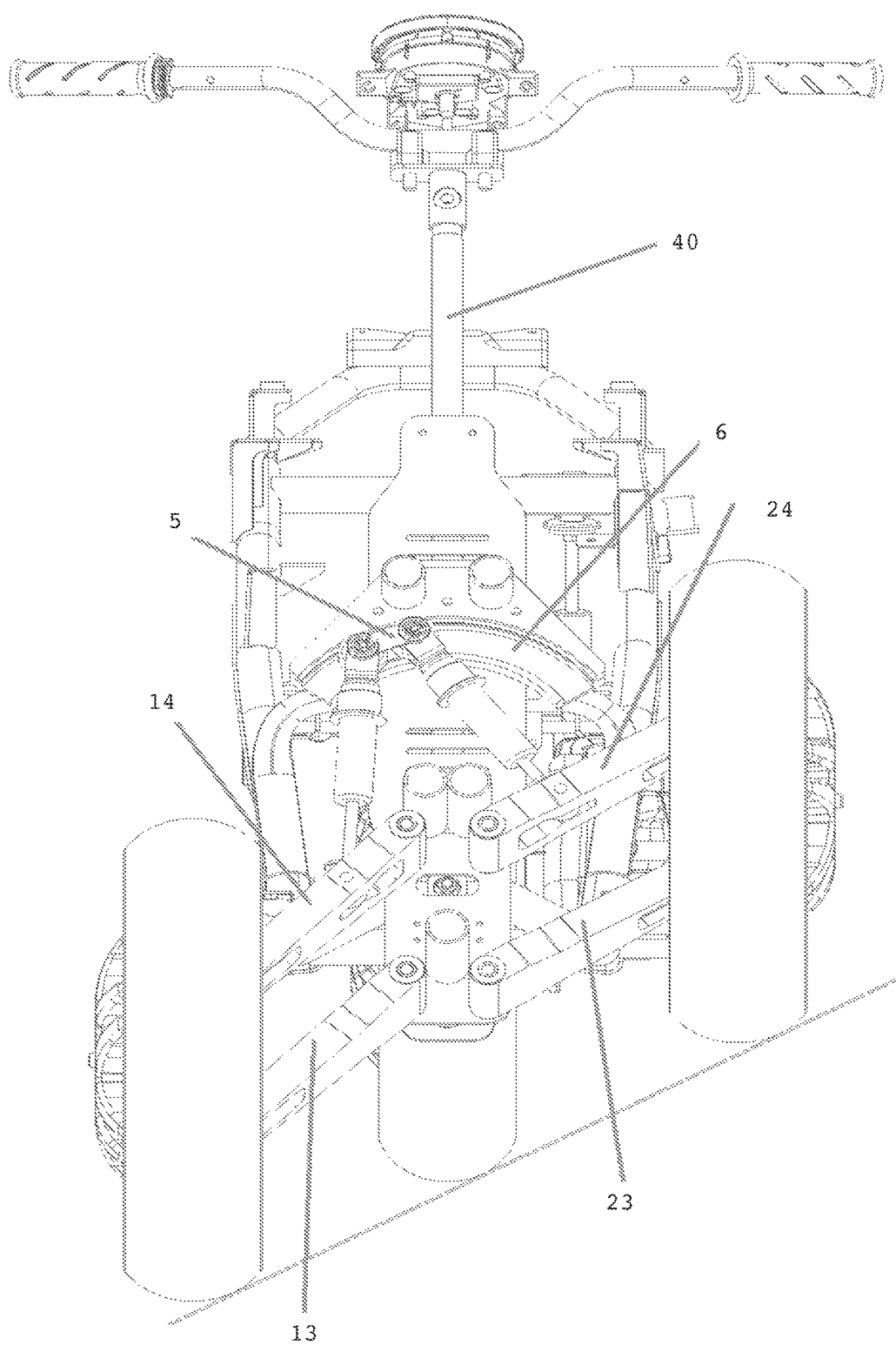

FIGS. 2 and 3 illustrate the modification to the geometry of the system for articulating tilting front wheels when the scooter changes from an equilibrium situation (FIG. 2) to an inclined situation (FIG. 3).

The bottom link (13) and the top link (14) form a first deformable parallelogram with the plate mounting the right front wheel.

The bottom link (23) and the top link (24) form a second deformable parallelogram with the plate mounting the left front wheel.

These two deformable parallelograms are symmetrical with respect to the median vertical plane when the scooter is in equilibrium, as depicted in the FIG. 2. When the scooter is inclined, these two parallelograms deform with a kinematics that is constrained by the movement of the carriage (6) moving on the rail (5).

Figure 4:
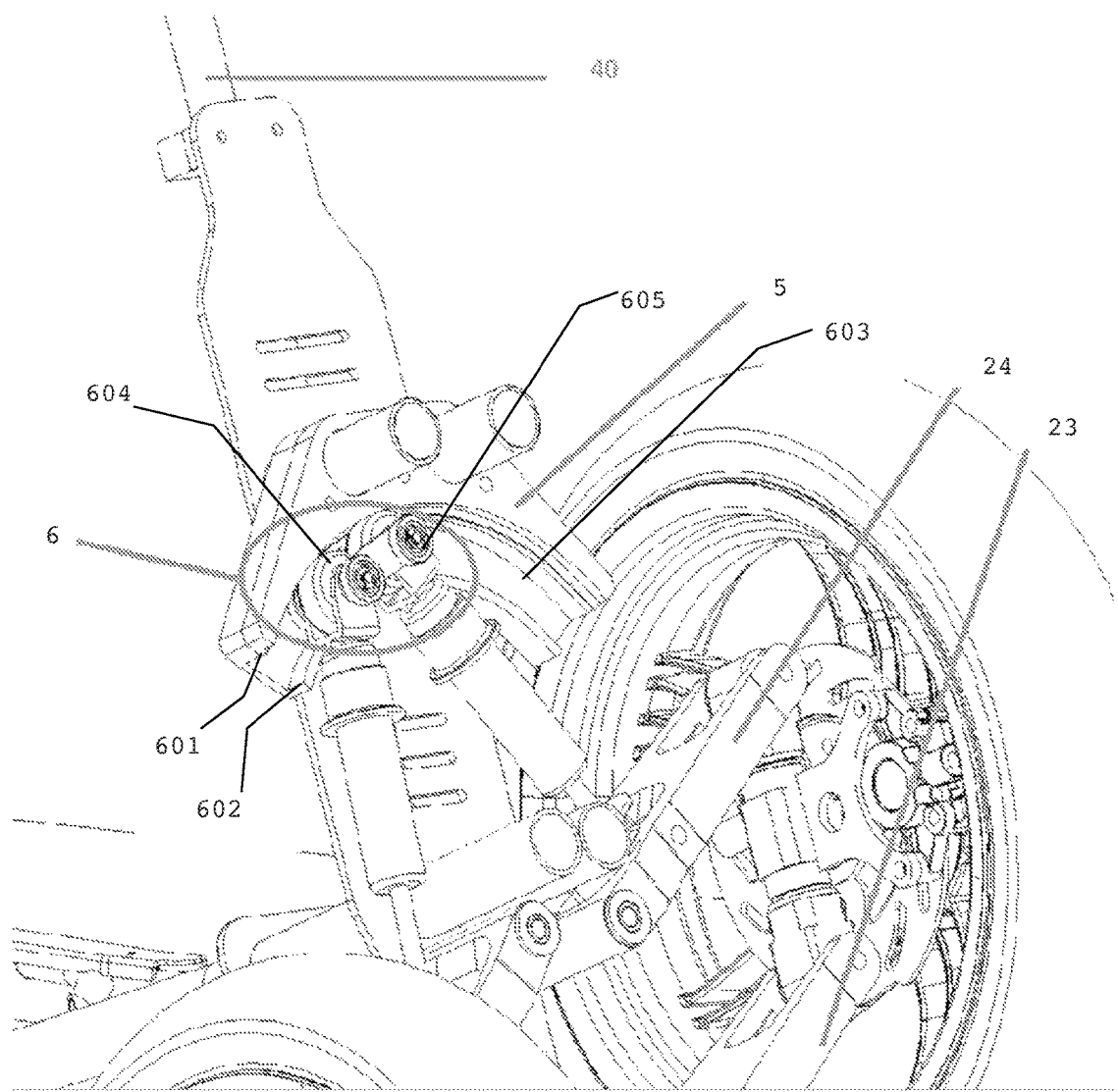
FIG. 4 depicts a detail view of the system for articulating the tilting front wheels.

FIG. 4 illustrates in more detail the guide system when the vehicle is inclined. The guide arch (5) has a guide path delimited by an arched top surface (601) and an arched bottom surface (602) defining between them an arched space (603) in which the plate (6) moves. The plate (6) has rollers (604, 605) providing guidance by rolling over the arched surfaces (601, 601).

Optionally, a system composed of two lateral carriages placed on either side of the central carriage and connected by springs assists the return to the straight top position. This system supplements or even replaces the irregular rounded form of the guide rail (5).

Moreover, a device for locking the carriage (6) with respect to the rail (5), formed by the serrated rounded jaw, provides the locking of the carriage and the rocking position of the scooter, with the possibility of locking as required (from +10° to −10°. This solution avoids or supplements the locking by the prop.

This system is coupled either to a contact sensor connected to the electronic box, preventing the starting of the engine or limiting the engine revolutions to a tickover speed to prevent speeding up with the locking system engaged, or connected to a cable or other mechanism for actuating the parking brake to prevent any movement of the vehicle.

Figure 5:
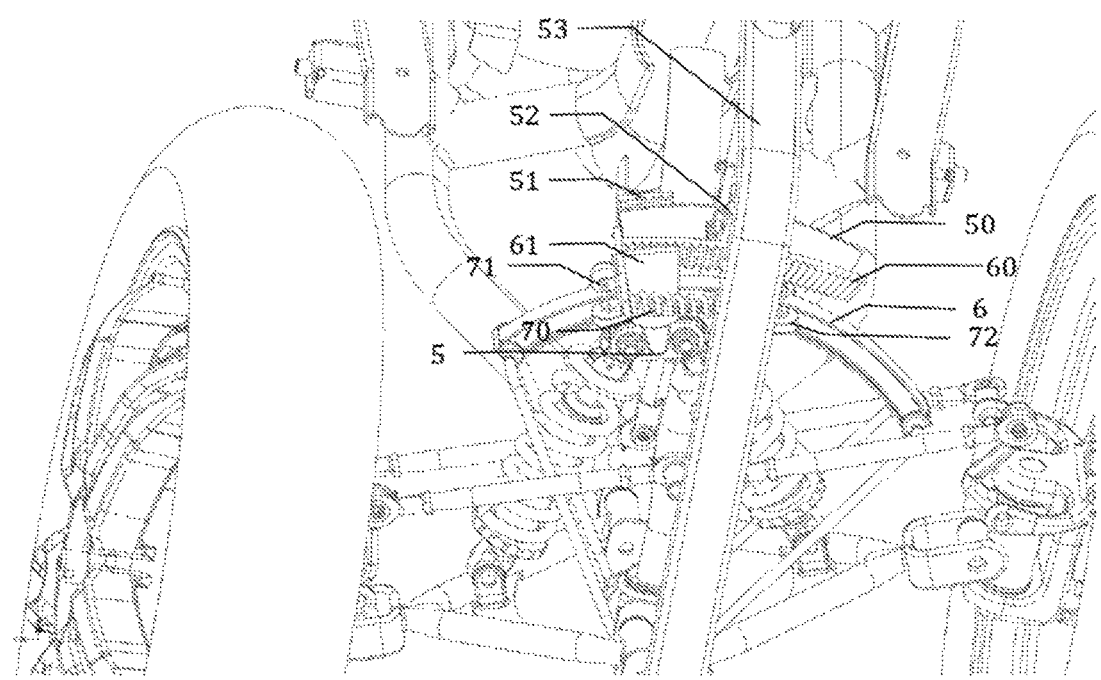
FIG. 5 depicts a detail view of the means for locking and holding the inclination.

FIG. 5 depicts a detail view of the means for locking the inclination.

The locking means consist of two movable parts (50, 60) and two fixed parts (51, 61).

The movable parts (50, 60) are formed by two arched notched plates (50, 60) with a radius of curvature in accordance with the radius of curvature of the arch (6). The teeth are oriented outwards.

A separation system (52) is disposed between the two movable parts (50, 60) and fixed to the frame (53). This system is controlled by a mechanical connection by means of a cable connected to a manual control.

When the separation system (52) is activated, it pushes the two movable parts (50, 60) outwards, until they come to mesh with the two fixed parts (51, 61) also notched, themselves inwards, secured to the guide plate (5). In this position, the two movable parts (50, 60) cooperate with the fixed parts (51, 61) in order to prevent the relative movement of the guide plate (5) with respect to the arch (6) and consequently with respect to the chassis (53). They thus prevent any change to the inclination of the vehicle.

The movable parts (50, 60) have a limited extension, less than the extension of the arch (6) since the locking of the movement is useful only for a limited travel centered on the vertical position.

This view also shows a return spring (70) that extends between a stop (71) secured to the first lateral carriage, coming to bear on the top stop of the central carriage (61), and an opposite stop coming into contact with the chassis (53) when the angle of inclination exceeds a reference value. This second stop is mounted on a second carriage (72) also positioned on the arch (6) symmetrically with respect to the central axis of the chassis.

Thus, when the inclination continues to increase, the spring (70) will exert an additional return force, tending to straighten up the vehicle.

Symmetrically, when the inclination changes side, it is the first stop (71) that comes into contact with the chassis, and the second stop (72) that acts on the top stop of the central carriage (61) in order to exert a return force.

Naturally the vehicle may comprise two (or more) return springs, disposed symmetrically with respect to the longitudinal plane.

The lateral carriages (71, 72) each have lateral rollers and a roller resting on the top part of the arch.

Hollow Arch

Figure 6A:
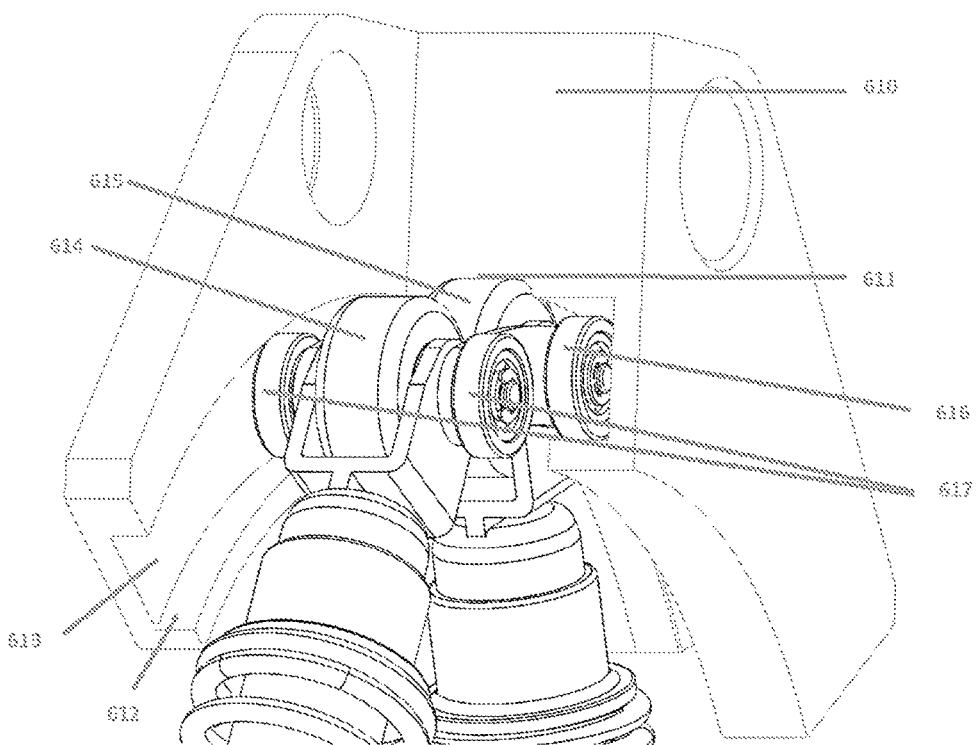
FIG. 6A depicts a view of the arch and of the guide plate.
Figure 6B:
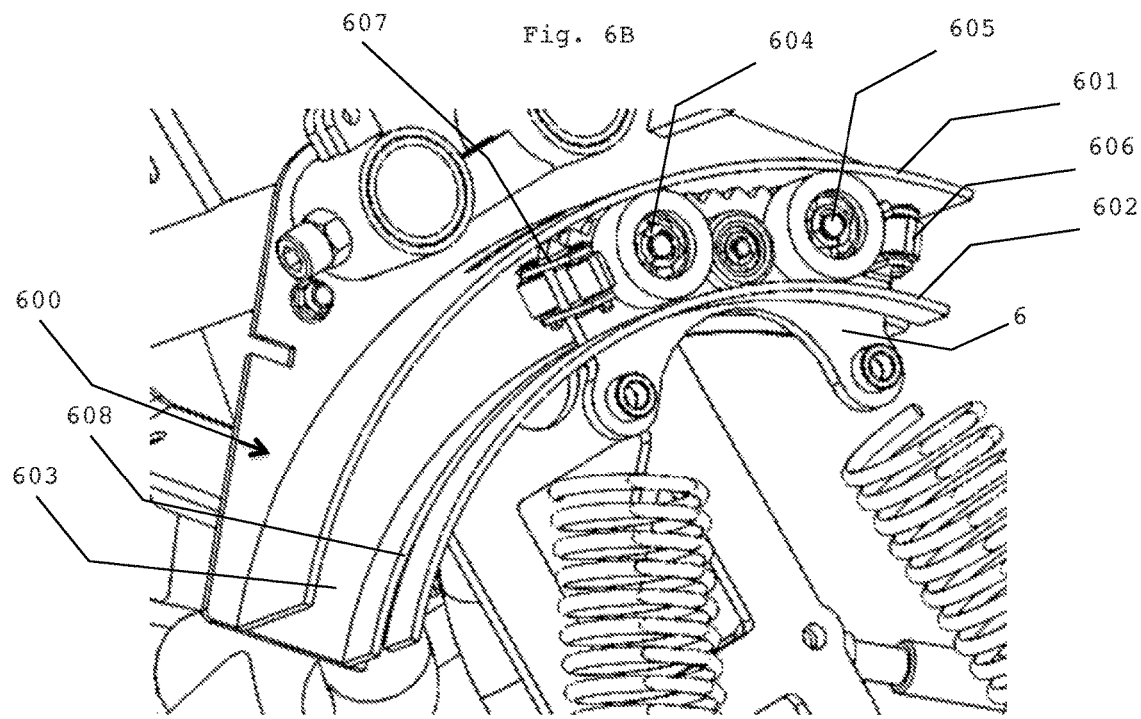
FIG. 6B depicts a view of the hollow arch and of the guide plate.

FIGS. 6A and 6B depict a view of a variant embodiment of the system for guiding the plate (6). The guide system (600) is formed by an arched profile, having a top guide path (601) and a bottom guide path (602) arched and parallel to each other, joined by a flat rear surface (603) and by a parallel front surface.

The plate (6) supports two rollers (604, 605) coming into abutment with at least one of the guide paths (602, 603) in order to guide the plate (6) on a curved path. The plate also has two series of rollers (606, 607) providing stability in the vertical plane. The bottom path (602) has a slot (608) for the plate (6) to pass.

FIG. 6A depicts a view of another variant embodiment of the system for guiding the plate (6). The guide system (610) is formed by an arched profile, having a top guide path (611) and a bottom guide path (612) arched and parallel to each other, joined by a flat rear surface (613) and by a parallel front surface.

The plate (6) supports two rollers (614, 615) providing stability in the vertical plane. The plate also has two series of rollers (616, 617) coming into abutment with at least one of the guide paths (612, 613) in order to guide the plate (6) on a curved path. The bottom path (612) has a slot (618) for the plate (6) to pass. This variant makes it possible to have control of the carriage in three dimensions while having the three bearings on two shafts. These two shafts serve as contact points for the two damper/suspension combinations.

Locking System

Figure 7:
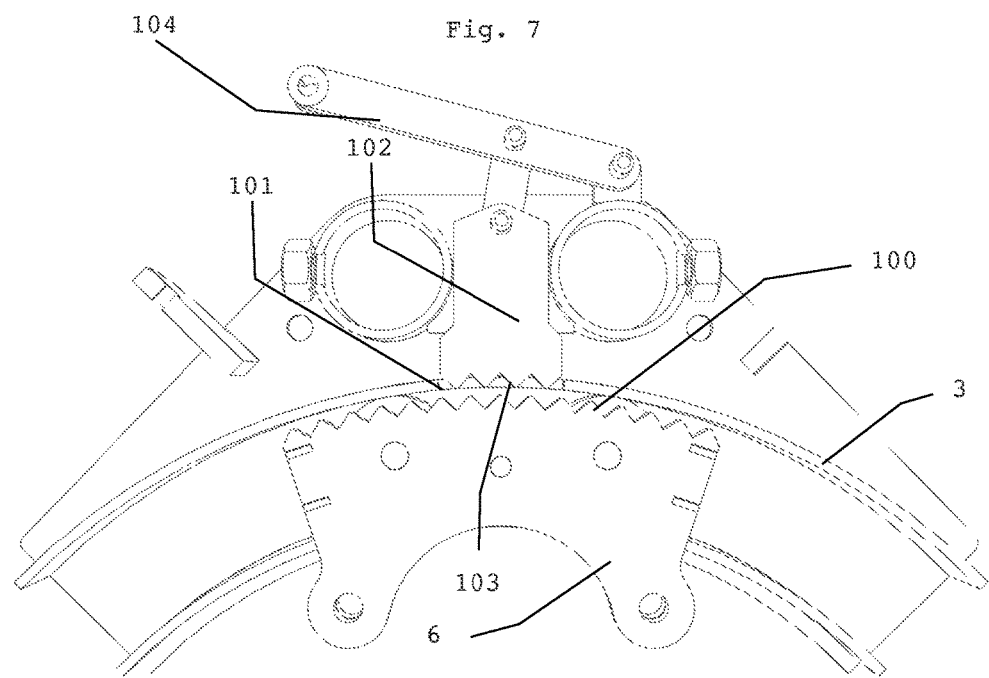
FIG. 7 depicts a view of a system for locking the plate, in the idle position.

FIG. 7 shows a view of a system for locking the plate, in the idle position.

The plate (6) has, on its top edge (100), at least one toothed zone. The arch (3) secured to the chassis has at least one window (101) for passage of a bolt (102), the bottom front surface of which has complementary teeth (103). This bolt (102) is actuated by a lever (104) and held in the disengaged position, at rest, by a return spring.

The lever (104) is actuated by the user in order to lock the tilting of the machine in the vertical position. The actuation may be combined with the parking brake and the steering lock. The antitheft device provides locking of the lever (104).

Optional Solution for Construction of the Chassis

Figure 8:
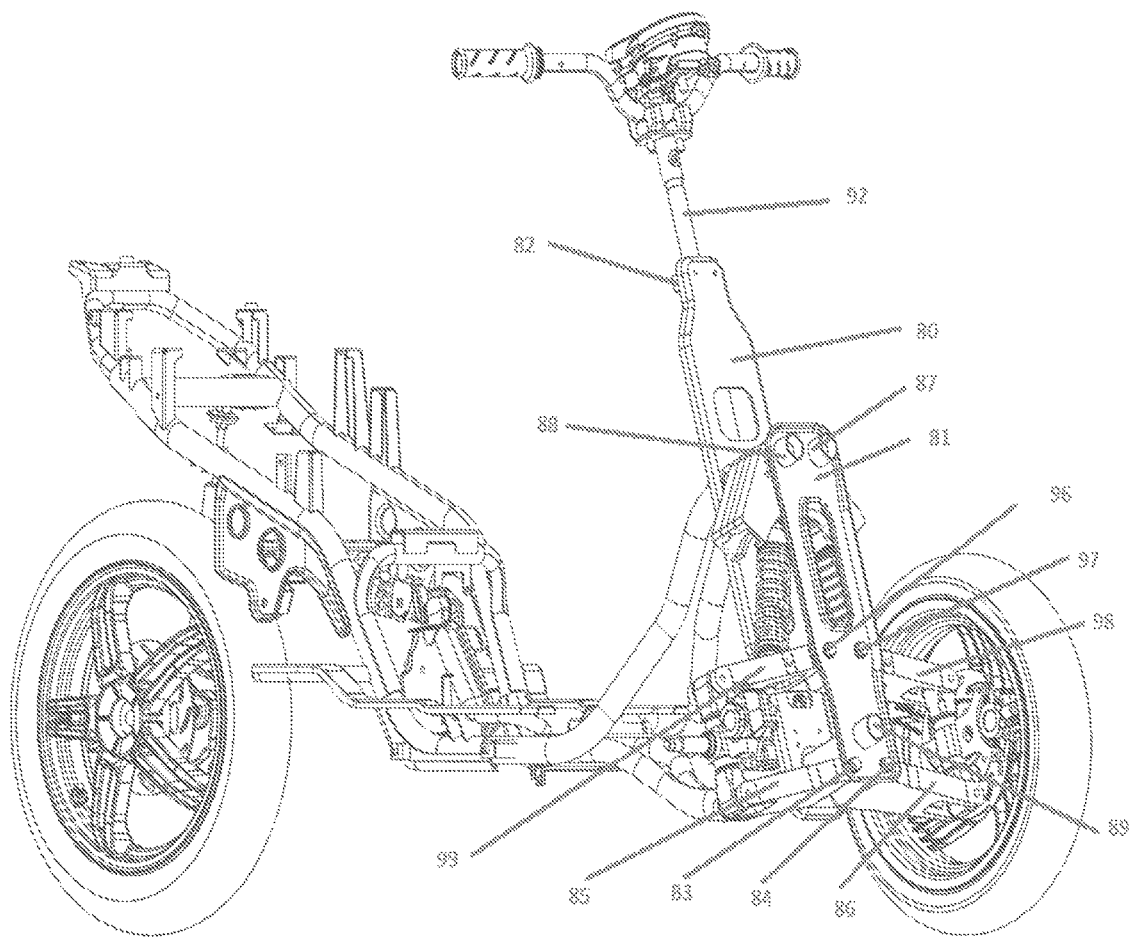
FIGS. 8 and 9 depict perspective and side views of the chassis.
Figure 9:
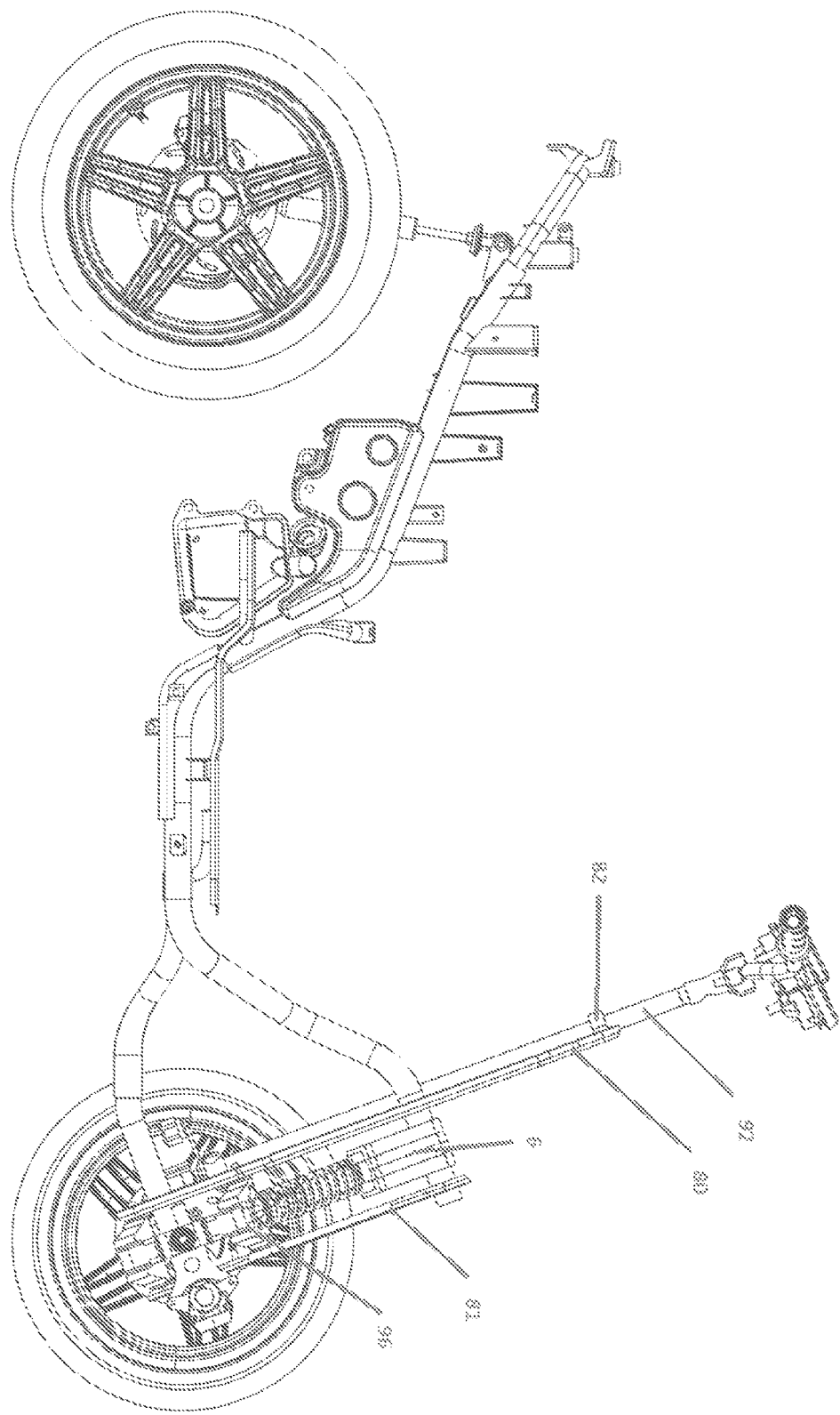

FIGS. 8 and 9 show perspective and side view of a chassis for a tricycle, formed by a fabricated assembly and having at its front part a rigid frame formed by two transverse plates (80, 81). The front plate (80) extends between a top ring (82) for guiding the steering column (92) and the shafts (83, 84) of the bottom suspension arms (85, 86).

The shafts (96, 97) of the top suspension arms (98, 99) are also fixed between the two transverse plates (80, 81).

This front plate (81) is secured to the rear plate (80) by means of tubes (87, 88, 89) extending the fabricated assembly.

The guide arch (6) is formed by an arched body (93) having internal surfaces for guiding the plate (3).

The available space between the two plates (80, 81) contains the guidance device, (optionally) the steering column (93) and the system for locking the guide arch. It may also contain other mechanical or electrical components.

Alternative Guide Rail

Figure 10:
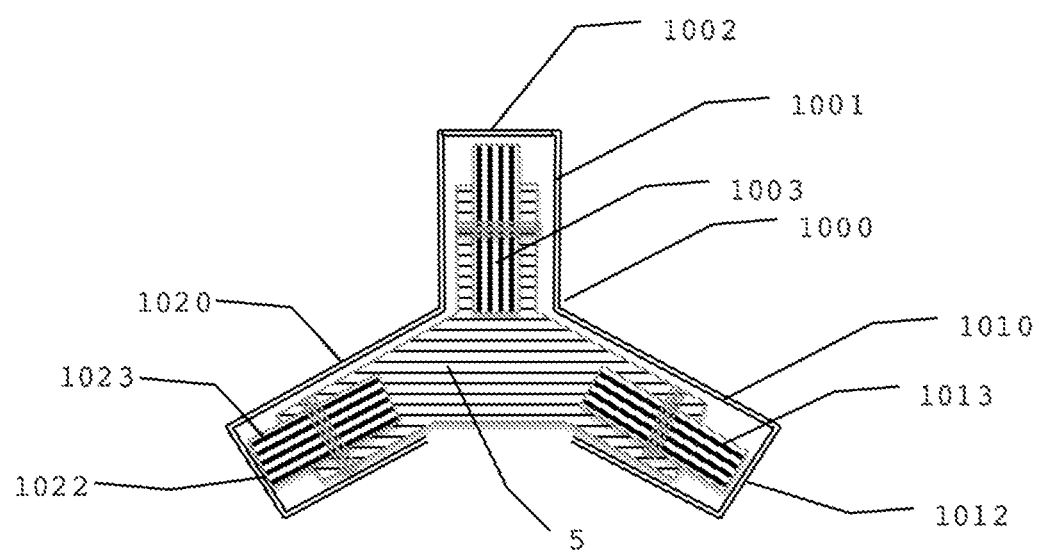
FIG. 10 depicts a variant embodiment of the guide rail.

FIG. 10 depicts a view in cross section of a variant embodiment of the guide rail (1000) secured to the chassis and having three lobes: a top lobe (1001) the bottom (1001) of which has a tile shape, the centre of rotation of which is parallel to the longitudinal axis of the vehicle. A first roller (1003) comes into abutment on the bottom (1002) of this first lobe (1001).

The guide rail (1000) has two lateral lobes (1010, 1020) extending with an angle of approximately 135° on either side of the top lobe (1001).

In each of its lateral lobes (1010, 1020), a respective roller (1013, 1023) comes into abutment on a base (1012, 1022).

The carriage (5) is formed by a piece supporting the three rollers (1002, 1012, and 1022) providing its positioning inside the guide structure (1000) and the connection with the suspension system, fixed on the bottom part of the carriage.

The invention claimed is:

1. An inclinable vehicle having a tilting front wheel set, comprising a double deformable parallelogram connecting the front wheel set to the chassis, said double deformable parallelogram having each a bottom suspension arm and a top suspension arm and two dampers associated with suspension springs, each connecting one of the bottom or top suspension arms, to a common connection plate, wherein said connection plate is guided by an arch secured to the chassis and providing guidance of the connection plate to a predefined path, the connection plate forming a moveable part moving on the path imposed by the arch secured to the chassis, wherein said arch is formed by a hollow piece connected to the chassis, and having a curved guide path cooperating with complementary means connected to said connection plate, wherein said complementary means are formed by at least two rollers pivoting freely about perpendicular axes and said at least two rollers configured to roll over or under the arch.

2. The inclinable vehicle according to claim 1, wherein said arch has a radius of curvature decreasing towards each of the ends.

3. The inclinable vehicle according to claim 1, wherein said connection plate is secured to a guide carriage complementary to a guide path provided on said arch.

4. The inclinable vehicle according to claim 1, wherein the ends of said guide arch are connected to the chassis by connection arms defining a window for the dampers to pass.

5. The inclinable vehicle according to claim 1, wherein said vehicle comprises a means for locking the relative movement of said connection plate with respect to said arch.

6. The inclinable vehicle according to claim 5, wherein said locking means is formed by at least one notched zone of said connection plate, and by at least one toothed plate able to move between a locking position in which it is meshed with said notch zone and an idle position in which it is disengaged from said toothed plate.

7. The inclinable vehicle according to claim 6, wherein said locking means is actuated by a mechanical connection connected by an actuation means to a mechanical member controlled by the rider.

8. The inclinable vehicle according to claim 1, wherein said vehicle comprises locking means formed by two movable parts and two fixed parts and a separation system disposed between the two movable parts fixed to the frame, to provide locking of the relative movement of the connection plate with respect to the arch.

9. The inclinable vehicle according to claim 8, wherein said vehicle comprises a chassis having at its front part two transverse plates or tubular structures, parallel to each other and to the steering column, the shafts of the suspension arms being mounted between said two transverse plates.

10. The inclinable vehicle according to claim 9, wherein said guide path is secured to said transverse plates.

11. The inclinable vehicle according to claim 1, wherein said arch has a guide path delimited by an arched top surface and an arched bottom surface defining between them an arched space in which said connection plate moves.

12. An inclinable vehicle having a tilting front wheel set, comprising a double deformable parallelogram connecting the front wheel set to the chassis, said double deformable parallelogram having each a bottom suspension arm and a top suspension arm and two dampers associated with suspension springs, each connecting one of the bottom or top suspension arms, to a common connection plate, wherein said connection plate is guided by an arch secured to the chassis and wherein said vehicle comprises locking means formed by two movable parts and two fixed parts and a separation system disposed between the two movable parts fixed to the frame, to lock the relative movement of the connection plate with respect to the arch.

13. The inclinable vehicle according to claim 12, wherein said vehicle comprises a chassis having at its front part two transverse plates or tubular structures, parallel to each other and to the steering column, the shafts of the suspension arms being mounted between said two transverse plates.

14. The inclinable vehicle according to claim 13, wherein said guide path is secured to said transverse plates.

15. An inclinable vehicle having a tilting front wheel set, comprising a double deformable parallelogram connecting the front wheel set to the chassis, said double deformable parallelogram having a bottom suspension arm and a top suspension arm and two dampers associated with the suspension springs, each connecting one of the bottom or top suspension arms to a common connection plate, wherein said connection plate is guided by an arch secured to the chassis and providing guidance of the connection plate on a predefined path, the connection plate forming a movable part moving on the path imposed by the arch secured to the chassis wherein said arch is formed by an arched profile, having a top guide path and a bottom guide path arched and parallel to each other, joined by a flat rear surface and by a parallel front surface, wherein said connection plate supports two rollers coming into abutment with at least one of the guide paths in order to guide the connection plate on a curved path, the bottom path having a slot for the connection plate to pass.

16. An inclinable vehicle having a tilting front wheel set, comprising a double deformable parallelogram connecting the front wheel set to the chassis, said double deformable parallelogram having a bottom suspension arm and a top suspension arm and two dampers associated with the suspension springs, each connecting one of the bottom or top suspension arms to a common connection plate, wherein said connection plate is guided by an arch secured to the chassis and providing guidance of the connection plate on a predefined path, the connection plate forming a movable part moving on the path imposed by the arch secured to the chassis wherein said arch is formed by an arched profile, having a top guide path and a bottom guide path arched and parallel to each other, joined by a flat rear surface and by a parallel front surface, wherein said connection plate supports two rollers providing stability in the vertical plane, said connection plate having two series of rollers coming into abutment with at least one of the guide paths in order to guide said connection plate on a curved path, the bottom path having a slot for the connection plate to pass.

* * * * *